(12) United States Patent
Tamura et al.

(10) Patent No.: US 8,916,644 B2
(45) Date of Patent: Dec. 23, 2014

(54) POLYPROPYLENE RESIN COMPOSITION FOR USE IN FORMATION OF MICROPOROUS MEMBRANE

(75) Inventors: Satoshi Tamura, Ichihara (JP); Ryoichi Tsunori, Ichihara (JP)

(73) Assignees: Toray Battery Separator Film Co., Ltd, Tochigi (JP); Prime Polymer Co., Ltd., Tokyo (JP)

( * ) Notice: Subject to any disclaimer, the term of this patent is extended or adjusted under 35 U.S.C. 154(b) by 424 days.

(21) Appl. No.: 13/143,337

(22) PCT Filed: Jan. 7, 2010

(86) PCT No.: PCT/JP2010/050090
§ 371 (c)(1),
(2), (4) Date: Jul. 5, 2011

(87) PCT Pub. No.: WO2010/079799
PCT Pub. Date: Jul. 15, 2010

(65) Prior Publication Data
US 2011/0269900 A1 Nov. 3, 2011

(30) Foreign Application Priority Data
Jan. 7, 2009 (JP) ................................. 2009-001950

(51) Int. Cl.
| | | |
|---|---|---|
| *H01M 2/16* | (2006.01) | |
| *C08K 3/00* | (2006.01) | |
| *C08F 4/76* | (2006.01) | |
| *C08F 110/06* | (2006.01) | |
| *B01D 63/00* | (2006.01) | |
| *H01G 9/02* | (2006.01) | |
| *B01D 67/00* | (2006.01) | |
| *B01D 69/02* | (2006.01) | |
| *B01D 71/26* | (2006.01) | |
| *C08J 5/18* | (2006.01) | |
| *C08L 23/12* | (2006.01) | |
| *H01G 9/00* | (2006.01) | |
| C08L 23/04 | (2006.01) | |
| H01M 10/0525 | (2010.01) | |

(52) U.S. Cl.
CPC ............... *H01G 9/02* (2013.01); *B01D 67/002* (2013.01); *B01D 67/0027* (2013.01); *B01D 67/003* (2013.01); *B01D 69/02* (2013.01); *B01D 71/26* (2013.01); *C08F 110/06* (2013.01); *C08J 5/18* (2013.01); *C08L 23/12* (2013.01); *H01G 9/155* (2013.01); *H01M 2/1653* (2013.01); *B01D 2323/06* (2013.01); *B01D 2323/12* (2013.01); *B01D 2325/22* (2013.01); *B01D 2325/32* (2013.01); *C08L 23/04* (2013.01); *H01M 10/0525* (2013.01); *Y02E 60/13* (2013.01)
USPC ........... 524/582; 524/584; 429/247; 429/251; 429/249; 525/240; 526/351; 526/348

(58) Field of Classification Search
CPC .............. H01M 2/16; C08K 3/00; C08F 4/76; C08F 110/06; C08L 23/12; B01D 63/00
USPC ............. 264/49; 525/323, 240; 429/249, 247, 429/251; 524/582, 584; 526/130, 351
See application file for complete search history.

(56) References Cited

U.S. PATENT DOCUMENTS

| | | | |
|---|---|---|---|
| 6,566,012 | B1 | 5/2003 | Takita et al. |
| 6,939,928 | B1 | 9/2005 | Kawai et al. |
| 7,183,020 | B2 | 2/2007 | Sudou et al. |
| 7,449,533 | B2 | 11/2008 | Kawai et al. |
| 8,491,991 | B2 | 7/2013 | Masuda et al. |
| 2007/0178324 | A1 | 8/2007 | Masuda et al. |
| 2007/0238017 | A1 | 10/2007 | Call et al. |
| 2009/0219672 | A1 | 9/2009 | Masuda et al. |
| 2010/0209758 | A1 | 8/2010 | Call et al. |

FOREIGN PATENT DOCUMENTS

| | | | |
|---|---|---|---|
| CN | 101180325 | A | 5/2008 |
| EP | 1 826 222 | A1 | 8/2007 |
| JP | 07-286075 | | 10/1995 |
| JP | 11-302436 | A | 11/1999 |
| JP | 2003-147035 | * | 5/2003 |
| JP | 2004-196871 | A | 7/2004 |
| JP | 2005-225919 | A | 8/2005 |
| JP | 2006-080057 | A | 3/2006 |
| JP | 3852492 | B2 | 11/2006 |
| JP | 2007-070609 | A | 3/2007 |

(Continued)

OTHER PUBLICATIONS

Office Action for CN 201080004099.2 dated Sep. 5, 2012.
European Communication dated May 22, 2012 with Supplementay European Search Report.
International Search Report issued Mar. 23, 2010; PCT/JP2010/050090; 5 pgs.
Office Action received in Japanese Patent Application No. 2010-545774 dated Jun. 17, 2014.

*Primary Examiner* — James J Seidleck
*Assistant Examiner* — Deve E Valdez
(74) *Attorney, Agent, or Firm* — Foley & Lardner LLP

(57) ABSTRACT

[Object] To provide a polypropylene resin composition for use in the formation of a microporous membrane having excellent heat resistance and strength.
[Solution] A polypropylene resin composition for use in the formation of a microporous membrane according to the present invention comprises as an essential component an ultra-high-molecular-weight propylene homopolymer (A) that satisfies the following requirements (1) to (4):
(1) the intrinsic viscosity [η] is 7 dl/g or more and less than 25 dl/g;
(2) the mesopentad fraction ranges from 90.0% to 99.5%;
(3) the melting point ranges from 153° C. to 167° C.; and
(4) in an elution temperature-elution volume curve measured by temperature-rising elution fractionation (TREF), the maximum peak has a peak top temperature in the range of 116° C. to 125° C. and a half-width of 7.0° C. or less.

6 Claims, No Drawings

(56) References Cited

FOREIGN PATENT DOCUMENTS

| | | |
|---|---|---|
| JP | 3995467 B2 | 10/2007 |
| JP | 2007-311332 A | 11/2007 |
| WO | WO-00/49074 A1 | 8/2000 |
| WO | WO-01/27124 A1 | 4/2001 |
| WO | WO-2005/103127 A1 | 11/2005 |
| WO | WO 2006/125672 A1 | 11/2006 |
| WO | WO-2007/046226 A1 | 4/2007 |
| WO | WO2008/140835 * | 11/2008 |

* cited by examiner

POLYPROPYLENE RESIN COMPOSITION FOR USE IN FORMATION OF MICROPOROUS MEMBRANE

TECHNICAL FIELD

The present invention relates to a polypropylene resin composition comprising an ultra-high-molecular-weight propylene homopolymer for use in the formation of a microporous membrane that has excellent heat resistance and strength.

BACKGROUND ART

Microporous membranes made of polymeric materials are used in various applications, for example, filter membranes and separation membranes for medical and industrial use, and separators, such as battery separators and condenser separators.

In particular, with the recent growing demand for secondary batteries as power supplies for mobile phones, mobile personal computers, and automobiles, there is also a growing demand for battery separators. However, battery separators made of conventional polymeric materials have insufficient characteristics, particularly unsatisfactory heat resistance.

Use of a blend of polyethylene (PE) and polypropylene (PP) or a higher-molecular-weight polyethylene (PE) to improve the heat resistance of battery separators has resulted in still insufficient characteristics and particularly cannot achieve high heat resistance.

Patent Literature 1 describes a high-molecular-weight PP having an MFR$\leq$1.2 g/10 min. However, the effect is unclear because Example fails to provide any data verifying the description.

Patent Literature 2 describes a separator made of polyolefins having different melting points. However, as shown in an example, a separator made of a PP having an MFR of 3 g/10 min and a high-density polyethylene (HDPE) having an MFR of 5.5 g/10 min does not have desired properties as a separator (for example, the upper limit temperature at which pores remain closed).

Patent Literature 3 describes a microporous membrane (separator) made of polyolefins having different viscosity-average molecular weights. However, a high-molecular-weight PE only is used, and there is no description of the properties of the separator.

Patent Literature 4 describes a microporous membrane (separator) made of a polyolefin, particularly a metallocene PE, having a residual Cl amount of 5 ppm or less and a viscosity-average molecular weight of 1,000,000 or more. However, the examples describe only a metallocene PE, and desired properties (for example, puncture strength at 150° C.) can not be achieved.

Patent Literature 5 describes a microporous membrane (separator) made of a PE having a viscosity-average molecular weight (Mv) of 300,000<Mv<600,000, a PE having a Mv of 600,000$\leq$Mv$\leq$10,000,000, and a PP (150,000$\leq$Mv$\leq$700,000). However, the microporous membrane (separator) does not have desired properties as a separator (for example, thermal fracture temperature).

Patent Literature 6 describes a microporous membrane (separator) made of a PE and a PP having a weight-average molecular weight (Mw) of 500,000 or more. However, the weight-average molecular weight Mw of PPs in an example is approximately 860,000 (MFR=0.4 g/10 min) at the maximum, and desired properties (for example, meltdown temperature) cannot be achieved.

Patent Literature 7 describes a microporous membrane (separator) made of two polyolefins each having a weight-average molecular weight (Mw) of 500,000 or more. However, the examples describe only HDPE, and desired heat resistance cannot be achieved.

As described above, application of high-molecular-weight polypropylenes to improve, for example, the heat resistance of microporous membranes has been conducted but had insufficient effects.

CITATION LIST

Patent Literature

Patent Literature 1: JP 2007-311332 A
Patent Literature 2: JP 3852492 B
Patent Literature 3: JP 2007-070609 A
Patent Literature 4: JP 2005-225919 A
Patent Literature 5: JP 3995467 B
Patent Literature 6: JP 2004-196871 A
Patent Literature 7: WO 00/49074 A

SUMMARY OF INVENTION

The present invention has been achieved in view of the situations described above. Accordingly, it is an object of the present invention to provide a polypropylene resin composition comprising an ultra-high-molecular-weight propylene homopolymer for use in the formation of a microporous membrane that has excellent heat resistance and strength.

A polypropylene resin composition for use in the formation of a microporous membrane according to the present invention comprises as an essential component an ultra-high-molecular-weight propylene homopolymer (A) that satisfies the following requirements (1) to (4):

(1) the intrinsic viscosity [η] measured with a decalin solution is 7 dl/g or more and less than 25 dl/g;

(2) the mesopentad fraction as measured by $^{13}$C-NMR (nuclear magnetic resonance) ranges from 90.0% to 99.5%;

(3) the melting point as measured with a differential scanning calorimeter (DSC) ranges from 153° C. to 167° C.; and (4) in an elution temperature-elution volume curve measured by temperature-rising elution fractionation (TREF) using o-dichlorobenzene, the maximum peak has a peak top temperature in the range of 116° C. to 125° C. and a half-width of 7.0° C. or less.

Preferably, the polypropylene resin composition for use in the formation of a microporous membrane according to the present invention further comprises at least one material selected from the group consisting of a plasticizer, a polyolefin other than polypropylene, and an inorganic powder.

Preferably, the polypropylene resin composition for use in the formation of a microporous membrane according to the present invention is used for one selected from the group consisting of a separator, a filter membrane, a separation membrane, and a filter.

The separator is more preferably a battery separator or a condenser separator. The battery separator is particularly preferably a lithium-ion secondary battery separator. The separation membrane is more preferably a medical separation membrane.

ADVANTAGEOUS EFFECTS OF INVENTION

Since the polypropylene resin composition for use in the formation of a microporous membrane according to the present invention comprises the propylene homopolymer (A) that satisfies the particular requirements, the polypropylene resin composition can form a microporous membrane having excellent heat resistance and strength.

DESCRIPTION OF EMBODIMENTS

The polypropylene resin composition for use in the formation of a microporous membrane according to the present invention will be more specifically described.
[Polypropylene Resin Composition for use in Formation of Microporous Membrane]

The polypropylene resin composition for use in the formation of a microporous membrane according to the present invention comprises as an essential component the ultra-high-molecular-weight propylene homopolymer (A) that satisfies the following requirements (1) to (4):

(1) the intrinsic viscosity [η] measured with a decalin solution is 7 dl/g or more and less than 25 dl/g;

(2) the mesopentad fraction as measured by $^{13}$C-NMR (nuclear magnetic resonance) ranges from 90.0% to 99.5%;

(3) the melting point as measured with a differential scanning calorimeter (DSC) ranges from 153° C. to 167° C.; and (4) in an elution temperature-elution volume curve measured by temperature-rising elution fractionation (TREF) using o-dichlorobenzene, the maximum peak has a peak top temperature in the range of 116° C. to 125° C. and a half-width of 7.0° C. or less.

In the polypropylene resin composition for use in the formation of a microporous membrane according to the present invention, the ultra-high-molecular-weight propylene homopolymer (A) content preferably ranges from 1% to 100% by mass, more preferably 5% to 80% by mass, still more preferably 10% to 60% by mass.

Although the polypropylene resin composition in which the ultra-high-molecular-weight propylene homopolymer (A) content is 100% by mass is practically not a composition, it is also defined as a composition in the present invention.

With the ultra-high-molecular-weight propylene homopolymer (A) content in these ranges, the resulting microporous membrane tends to have excellent heat resistance and strength.

The requirements (1) to (4) will be described in detail below.
<<Requirement (1)>>

The ultra-high-molecular-weight propylene homopolymer (A) for use in the present invention has an intrinsic viscosity [η] measured with a decalin solution of 7 dl/g or more and less than 25 dl/g, preferably 7.2 dl/g or more and less than 22 dl/g, more preferably 7.4 dl/g or more and less than 21 dl/g. A polymer having an intrinsic viscosity [η] within these ranges can be produced by using a Ziegler-type catalyst described below suitable for the purposes of the present invention and appropriately controlling the polymerization conditions, such as the amount of the catalyst to be added. For example, the amount of the catalyst to be added can be increased to increase the intrinsic viscosity [η].

An intrinsic viscosity [η] of less than 7 dl/g results in less molecular entanglements. Thus, the obtained microporous membrane cannot have desired strength. An intrinsic viscosity [η] of 25 dl/g or more makes stretching difficult. Thus, a desired microporous membrane cannot be manufactured.
<<Requirement (2)>>

The ultra-high-molecular-weight propylene homopolymer (A) for use in the present invention has a mesopentad fraction as measured by $^{13}$C-NMR in the range of 90.0% to 99.5%, preferably 93.5% to 99.5%, more preferably 94.0% to 99.5%.

The mesopentad fraction (mmmm fraction) refers to a percentage of isotactic chains of a pentad unit in a molecular chain, that is, a fraction of propylene monomer unit existing in the center of a chain in which five propylene monomer units are meso bonded. Use of a Ziegler-type catalyst or a donor suitable for the purposes of the present invention can yield a polymer having a mesopentad fraction within these ranges. The mesopentad fraction can be controlled by changing the polymerization temperature.

The mesopentad fraction of the ultra-high-molecular-weight propylene homopolymer (A) within these ranges results in a microporous membrane having excellent heat resistance and strength.
<<Requirement (3)>>

The ultra-high-molecular-weight propylene homopolymer (A) for use in the present invention has a melting point as measured by DSC in the range of 153° C. to 167° C., preferably 160° C. to 166° C. A Ziegler-type catalyst described below suitable for the purposes of the present invention can be used to produce a polymer having a melting point within these ranges. The melting point of the ultra-high-molecular-weight propylene homopolymer (A) within these ranges results in a microporous membrane having excellent heat resistance.

The ultra-high-molecular-weight propylene homopolymer (A) having a melting point of less than 153° C. as measured by DSC cannot yield a microporous membrane having desired heat resistance. The ultra-high-molecular-weight propylene homopolymer (A) having a melting point of more than 167° C. cannot yield a desired microporous membrane.
<<Requirement (4)>>

In an elution temperature-elution volume curve of temperature-rising elution fractionation (TREF) using o-dichlorobenzene, the ultra-high-molecular-weight propylene homopolymer (A) for use in the present invention has a peak top temperature of the maximum peak in the range of 116° C. to 125° C., preferably 117° C. to 125° C., more preferably 118° C. to 125° C., and a half-width of the peak of 7.0° C. or less, preferably 6.0° C. or less, more preferably 5.5° C. or less. The lower limit of the half-width is, but not limited to, 1.0° C.

The peak top temperature within these ranges tends to result in a microporous membrane having an excellent melt-down temperature. The half-width within these ranges tends to result in a microporous membrane having high air permeability.

Methods for measuring these properties will be described later.

The term "ultra-high-molecular-weight polypropylene", as used herein, refers to a polypropylene having a weight-average molecular weight (Mw) of 1,000,000 to 6,000,000, preferably 1,100,000 to 5,500,000, more preferably 1,200,000 to 5,000,000.

Use of the polypropylene resin composition comprising the ultra-high-molecular-weight propylene homopolymer (A) as an essential component can produce a microporous membrane having excellent heat resistance and strength.
(Method for Manufacturing Ultra-High-Molecular-Weight Propylene Homopolymer (A))

A method for manufacturing the ultra-high-molecular-weight propylene homopolymer (A) will be described below.

A method for manufacturing the ultra-high-molecular-weight propylene homopolymer (A) for use in the present invention is not particularly limited provided that the propylene homopolymer (A) satisfies the requirements (1) to (4). In one exemplary manufacturing method, propylene is homopolymerized in a presence of a high stereoregular Ziegler-Natta catalyst. Various known catalysts may be used as the high stereoregular Ziegler-Natta catalysts, such as a catalyst comprising (a) a solid titanium catalyst component comprising magnesium, titanium, a halogen, and an electron donor, (b) an organometallic compound catalyst component, and (c) an organosilicon compound catalyst component having at least one group selected from the group consisting of a cyclopentyl group, a cyclopentenyl group, a cyclopentadienyl group, and derivatives thereof.

The solid titanium catalyst component (a) may be prepared by bringing a magnesium compound (a-1), a titanium compound (a-2), and an electron donor (a-3) into contact with each other.

Examples of the magnesium compound (a-1) include magnesium compounds having reducing ability, such as magnesium compounds having a magnesium-carbon bond or a magnesium-hydrogen bond, and magnesium compounds having no reducing ability, such as halogenated magnesium, alkoxymagnesium halides, allyloxymagnesium halides, alkoxymagnesium, allyloxymagnesium, and magnesium carboxylates.

In the preparation of the solid titanium catalyst component (a), for example, a tetravalent titanium compound represented by the following formula (1) is preferably used as the titanium compound (a-2).

$$Ti(OR)_g X_{4-g} \quad (1)$$

wherein R denotes a hydrocarbon group, X denotes a halogen atom, and g is a number in the range of $0 \leq g \leq 4$.

Specific examples of the tetravalent titanium compound include tetrahalogenated titanium, such as $TiCl_4$, $TiBr_4$, and $TiI_4$; trihalogenated alkoxytitanium, such as $Ti(OCH_3)Cl_3$, $Ti(OC_2H_5)Cl_3$, $Ti(O-n-C_4H_9)Cl_3$, $Ti(OC_2H_5)Br_3$, and $Ti(O-iso-C_4H_9)Br_3$; dihalogenated dialkoxy titanium, such as $Ti(OCH_3)_2Cl_2$, $Ti(OC_2H_5)_2Cl_2$, $Ti(O-n-C_4H_9)_2Cl_2$, and $Ti(OC_2H_5)_2Br_2$; monohalogenated trialkoxy titanium, such as $Ti(OCH_3)_3Cl$, $Ti(OC_2H_5)_3Cl$, $Ti(O-n-C_4H_9)_3Cl$, and $Ti(OC_2H_5)_3Br$; and tetraalkoxytitanium, such as $Ti(OCH_3)_4$, $Ti(OC_2H_5)_4$, $Ti(O-n-C_4H_9)_4$, $Ti(O-iso-C_4H_9)_4$, and $Ti(O-2-ethylhexyl)_4$.

Examples of the electron donor (a-3) used in the preparation of the solid titanium catalyst component (a) include alcohols, phenols, ketones, aldehydes, esters of organic acids and inorganic acids, organic acid halides, ethers, acid amides, acid anhydrides, ammonia, amines, nitriles, isocyanates, nitrogen-containing cyclic compounds, and oxygen-containing cyclic compounds.

When the magnesium compound (a-1), the titanium compound (a-2), and the electron donor (a-3) are brought into contact with each other, another reactive agent, such as silicon, phosphorus, or aluminum, may coexist. Furthermore, a carrier may be used to prepare a solid titanium catalyst component (a) supported by the carrier.

The solid titanium catalyst component (a) may be used by any method, including known methods. Some exemplary methods are briefly described below.

(1) A method in which a hydrocarbon solution of a magnesium compound (a-1) comprising an electron donor (liquefying agent) (a-3) is allowed to react with an organometallic compound and, after a solid has been precipitated or while the solid is precipitated, is allowed to react with a titanium compound (a-2).

(2) A method in which a complex between a magnesium compound (a-1) and an electron donor (a-3) is allowed to react with an organometallic compound and then with a titanium compound (a-2).

(3) A method in which a contact product between an inorganic carrier and an organomagnesium compound (a-1) is allowed to react with a titanium compound (a-2) and an electron donor (a-3). The contact product may be allowed to react with a halogen-containing compound and/or an organometallic compound in advance.

(4) A method in which a carrier loaded with a magnesium compound (a-1) is prepared from a mixture of a magnesium compound (a-1) solution containing a liquefying agent and optionally a hydrocarbon solvent, an electron donor (a-3), and the carrier and is then brought into contact with a titanium compound (a-2).

(5) A method in which a solution containing a magnesium compound (a-1), a titanium compound (a-2), an electron donor (a-3), and optionally a hydrocarbon solvent is brought into contact with a carrier.

(6) A method in which a liquid organomagnesium compound (a-1) is brought into contact with a halogen-containing titanium compound (a-2). An electron donor (a-3) is used at least once.

(7) A method in which a liquid organomagnesium compound (a-1) is brought into contact with a halogen-containing compound and then with a titanium compound (a-2). Through this process, an electron donor (a-3) is used at least once.

(8) A method in which a magnesium compound (a-1) containing an alkoxy group is brought into contact with a halogen-containing titanium compound (a-2). An electron donor (a-3) is used at least once.

(9) A method in which a complex between a magnesium compound (a-1) containing an alkoxy group and an electron donor (a-3) is brought into contact with a titanium compound (a-2).

(10) A method in which a complex between a magnesium compound (a-1) containing an alkoxy group and an electron donor (a-3) is brought into contact with an organometallic compound and is then allowed to react with a titanium compound (a-2).

(11) A method in which a magnesium compound (a-1), an electron donor (a-3), and a titanium compound (a-2) are allowed to contact and react in any order. Before this reaction, each of the component may be subjected to preliminary treatment with a reaction aid, such as an electron donor (a-3), an organometallic compound, or a halogen-containing silicon compound.

(12) A method in which a liquid magnesium compound having no reducing ability (a-1) is allowed to react with a liquid titanium compound (a-2) in the presence of an electron donor (a-3) to precipitate a solid magnesium-titanium complex.

(13) A method in which the reaction product of (12) is further allowed to react with a titanium compound (a-2).

(14) A method in which the reaction product of (11) or (12) is further allowed to react with an electron donor (a-3) and a titanium compound (a-2).

(15) A method in which a solid prepared by pulverizing a magnesium compound (a-1), a titanium compound (a-2), and an electron donor (a-3) is treated with a halogen, a halide, or an aromatic hydrocarbon. This method may include a process of pulverizing the magnesium compound (a-1) alone, a complex compound between the magnesium compound (a-1) and the electron donor (a-3), or the magnesium compound (a-1) and the titanium compound (a-2). The pulverization may be followed by preliminary treatment with a reaction aid and then by halogen treatment. The reaction aid may be an organometallic compound or a halogen-containing silicon compound.

(16) A method in which a magnesium compound (a-1) is pulverized and is then brought into contact with a titanium compound (a-2). When the magnesium compound (a-1) is pulverized and/or brought into contact with a titanium compound (a-2), an electron donor (a-3) is used, if necessary, together with a reaction aid.

(17) A method in which the compound produced in any one of (11) to (16) is treated with a halogen, a halide, or an aromatic hydrocarbon.

(18) A method in which a reaction product from a metal oxide, an organomagnesium (a-1), and a halogen-containing compound is brought into contact with an electron donor (a-3) and preferably a titanium compound (a-2).

(19) A method in which a magnesium compound (a-1), such as a magnesium salt of an organic acid, an alkoxymagnesium, or an aryloxymagnesium, is brought into contact with a titanium compound (a-2), an electron donor (a-3), and if necessary a halogen-containing hydrocarbon.

(20) A method in which a hydrocarbon solution comprising a magnesium compound (a-1) and an alkoxytitanium is brought into contact with an electron donor (a-3) and if necessary a titanium compound (a-2). Preferably, a halogen-containing compound, such as a halogen-containing silicon compound, coexist.

(21) A method in which a liquid magnesium compound having no reducing ability (a-1) is allowed to react with an organometallic compound to precipitate a solid magnesium-metal (aluminum) complex and is then allowed to react with an electron donor (a-3) and a titanium compound (a-2).

The organometallic compound catalyst component (b) is preferably a component comprising aluminum and/or a metal selected from the groups I to III of the periodic table and specifically includes an organoaluminum compound (b-1), a complex alkyl compound (b-2) between a group I metal and aluminum, and an organometallic compound (b-3) of a group II or III metal as described below.

The organoaluminum compound (b-1) represented by formula $R^1_m Al(OR^2)_n H_p X_q$, wherein $R^1$ and $R^2$, which may be the same or different, denote a hydrocarbon group generally having 1 to 15 (preferably 1 to 4) carbon atoms, X denotes a halogen atom, m denotes a number in the range of $0 < m \leq 3$, n denotes a number in the range of $0 \leq n < 3$, p denotes a number in the range of $0 \leq p < 3$, q denotes a number in the range of $0 \leq q < 3$, and $m+n+p+q=3$.

The complex alkylated compound (b-2) between a group I metal and aluminum represented by formula $M^1 AlR^1_4$, wherein $M^1$ denotes Li, Na, or K, and $R^1$ denotes a hydrocarbon group generally having 1 to 15 (preferably 1 to 4) carbon atoms.

The organometallic compound (dialkyl compound) (b-3) of a group II or III metal represented by formula $R^1 R^2 M^2$, wherein $R^1$ and $R^2$, which may be the same or different, denote a hydrocarbon group generally having 1 to 15 (preferably 1 to 4) carbon atoms, and $M^2$ denotes Mg, Zn, or Cd.

Examples of the organoaluminum compound (b-1) include a compound represented by $R^1_m Al(OR^2)_{3-m}$ (wherein $R^1$ and $R^2$, which may be the same or different, denote a hydrocarbon group generally having 1 to 15 (preferably 1 to 4) carbon atoms, and m is preferably a number in the range of $1.5 \leq m \leq 3$), a compound represented by $R^1_m AlX_{3-m}$ (wherein $R^1$ denotes a hydrocarbon group generally having 1 to 15 (preferably 1 to 4) carbon atoms, X denotes a halogen atom, and m is preferably a number in the range of $0 < m < 3$), a compound represented by $R^1_m AlH_3$, (wherein $R^1$ denotes a hydrocarbon group generally having 1 to 15 (preferably 1 to 4) carbon atoms, and m is preferably a number in the range of $2 \leq m < 3$), and a compound represented by $R^1_m Al(OR^2)_n X_q$ (wherein $R^1$ and $R^2$, which may be the same or different, denote a hydrocarbon group generally having 1 to 15 (preferably 1 to 4) carbon atoms, X denotes a halogen atom, m is a number in the range of $0 < m \leq 3$, n is a number in the range of $0 \leq n < 3$, q is a number in the range of $0 \leq q < 3$, and $m+n+q=3$).

Specific examples of the organosilicon compound catalyst component (c) include organosilicon compounds represented by the following formula (2):

$$SiR^3 R^4_a (OR^5)_{3-a} \quad (2)$$

wherein a denotes 0, 1, or 2, $R^3$ denotes a group selected from the group consisting of a cyclopentyl group, a cyclopentenyl group, a cyclopentadienyl group, and derivatives thereof, and $R^4$ and $R^5$ independently denote a hydrocarbon group.

Specific examples of $R^3$ in the formula (2) include a cyclopentyl group and derivatives thereof, such as a cyclopentyl group, a 2-methylcyclopentyl group, a 3-methylcyclopentyl group, a 2-ethylcyclopentyl group, a 3-propylcyclopentyl group, a 3-isopropylcyclopentyl group, a 3-butylcyclopentyl group, a 3-tert-butylcyclopentyl group, a 2,2-dimethylcyclopentyl group, a 2,3-dimethylcyclopentyl group, a 2,5-dimethylcyclopentyl group, a 2,2,5-trimethylcyclopentyl group, a 2,3,4,5-tetramethylcyclopentyl group, a 2,2,5,5-tetramethylcyclopentyl group, a 1-cyclopentylpropyl group, and a 1-methyl-1-cyclopentylethyl group; a cyclopentenyl group and derivatives thereof, such as a cyclopentenyl group, a 2-cyclopentenyl group, a 3-cyclopentenyl group, a 2-methyl-1-cyclopentenyl group, a 2-methyl-3-cyclopentenyl group, a 3-methyl-3-cyclopentenyl group, a 2-ethyl-3-cyclopentenyl group, a 2,2-dimethyl-3-cyclopentenyl group, a 2,5-dimethyl-3-cyclopentenyl group, a 2,3,4,5-tetramethyl-3-cyclopentenyl group, and a 2,2,5,5-tetramethyl-3-cyclopentenyl group; a cyclopentadienyl group and derivatives thereof, such as a 1,3-cyclopentadienyl group, a 2,4-cyclopentadienyl group, a 1,4-cyclopentadienyl group, a 2-methyl-1,3-cyclopentadienyl group, a 2-methyl-2,4-cyclopentadienyl group, a 3-methyl-2,4-cyclopentadienyl group, a 2-ethyl-2,4-cyclopentadienyl group, a 2,2-dimethyl-2,4-cyclopentadienyl group, a 2,3-dimethyl-2,4-cyclopentadienyl group, a 2,5-dimethyl-2,4-cyclopentadienyl group, and a 2,3,4,5-tetramethyl-2,4-cyclopentadienyl group; and derivatives of a cyclopentyl group, a cyclopentenyl group, and a cyclopentadienyl group, such as an indenyl group, a 2-methylindenyl group, a 2-ethylindenyl group, a 2-indenyl group, a 1-methyl-2-indenyl group, a 1,3-dimethyl-2-indenyl group, an indanyl group, a 2-methylindanyl group, a 2-indanyl group, a 1,3-dimethyl-2-indanyl group, a 4,5,6,7-tetrahydroindenyl group, a 4,5,6,7-tetrahydro-2-indenyl group, a 4,5,6,7-tetrahydro-1-methyl-2-indenyl group, a 4,5,6,7-tetrahydro-1,3-dimethyl-2-indenyl group, and a fluorenyl group.

Specific examples of the hydrocarbon group of $R^4$ and $R^5$ in the formula (2) include hydrocarbon groups, such as alkyl groups, cycloalkyl groups, aryl groups, and aralkyl groups. Two or more $R^4$ present, $R^4$s may be the same or different from each other, two or more $R^5$ present, $R^5$s may be the same or different from each other, and $R^4$s may be the same as or different from $R^5$s. $R^3$ and $R^4$ in the formula (2) may be bridged via an alkylene group or the like.

Among organosilicon compounds represented by the formula (2), an organosilicon compound in which $R^3$ is a cyclopentyl group, $R^4$ is an alkyl group or a cyclopentyl group, and $R^5$ is an alkyl group, particularly a methyl group or an ethyl group, is preferred.

Specific examples of the organosilicon compounds represented by the formula (2) include trialkoxysilanes, such as cyclopentyltrimethoxysilane, 2-methylcyclopentyltrimethoxysilane, 2,3-dimethylcyclopentyltrimethoxysilane, 2,5-dimethylcyclopentyltrimethoxysilane, cyclopentyltriethoxysilane, cyclopentenyltrimethoxysilane, 3-cyclopentenyltrimethoxysilane, 2,4-cyclopentadienyltrimethoxysilane, indenyltrimethoxysilane, and fluorenyltrimethoxysilane; dialkoxysilanes, such as dicyclopentyldimethoxysilane, bis (2-methylcyclopentyl)dimethoxysilane, bis(3-tert-butylcyclopentyl)dimethoxysilane, bis(2,3-dimethylcyclopentyl) dimethoxysilane, bis(2,5-dimethylcyclopentyl) dimethoxysilane, dicyclopentyldiethoxysilane, dicyclopentenyldimethoxysilane, di(3-cyclopentenyl) dimethoxysilane, bis(2,5-dimethyl-3-cyclopentenyl) dimethoxysilane, di-2,4-cyclopentadienyldimethoxysilane, bis(2,5-dimethyl-2,4-cyclopentadienyl)dimethoxysilane, bis (1-methyl-1-cyclopentylethyl)dimethoxysilane, cyclopentylcyclopentenyldimethoxysilane, cyclopentylcyclopentadienyldimethoxysilane, diindenyldimethoxysilane, bis(1,3-dimethyl-2-indenyl)dimethoxysilane, cyclopentadienylindenyldimethoxysilane, difluorenyldimethoxysilane, cyclopentylfluorenyldimethoxysilane, and indenylfluorenyldimethoxysilane; monoalkoxysilanes, such as tricyclopentylmethoxysilane, tricyclopentenylmethoxysilane, tricyclopentadienylmethoxysilane, tricyclopentylethoxysilane, dicyclopentylmethylmethoxysilane, dicyclopentylethylmethoxysilane, dicyclopentylmethylethoxysilane, cyclopentyldimethylmethoxysilane, cyclopentyldiethylmethoxysilane, cyclopentyldimethylethoxysilane, bis(2,5-dimethylcyclopentyl)cyclopentylmethoxysilane, dicyclopentylcyclopentenylmethoxysilane, dicyclopentylcyclopentadienylmethoxysilane, and diindenylcyclopentylmethoxysilane; and others, such as ethylenebiscyclopentyldimethoxysilane.

Prepolymerization may be performed in the polymerization of propylene using a catalyst comprising the solid titanium catalyst component (a), the organometallic compound catalyst component (b), and the organosilicon compound catalyst component (c). In the prepolymerization, an olefin is polymerized in the presence of the solid titanium catalyst component (a), the organometallic compound catalyst component (b), and if necessary the organosilicon compound catalyst component (c).

The olefin in the prepolymerization may be an α-olefin having 2 to 8 carbon atoms. Specific examples of the olefin include linear olefins, such as ethylene, propylene, 1-butene, and 1-octene; and olefins having a branched structure, such as 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, and 3-ethyl-1-hexene. These olefins may be copolymerized.

It is desirable to perform the prepolymerization so as to produce approximately 0.1 to 1000 g, preferably approximately 0.3 to 500 g, of a polymer per gram of the solid titanium catalyst component (a). An excessive amount of polymer produced in the prepolymerization may result in a low yield of the polymer in the main polymerization. The catalyst concentration may be much higher in the prepolymerization than in the main polymerization.

In the main polymerization, it is desirable to use the solid titanium catalyst component (a) (or prepolymerized catalyst) in an amount of approximately 0.0001 to 50 mmol, preferably approximately 0.001 to 10 mmol, in terms of a titanium atom per liter of the polymerization volume. It is desirable to use the organometallic compound catalyst component (b) in an amount of approximately 1 to 2000 mol, preferably approximately 2 to 500 mol in terms of a metal atom per mol of titanium atom in the polymerization system. It is desirable to use the organosilicon compound catalyst component (c) in an amount of approximately 0.001 to 50 mol, preferably approximately 0.01 to 20 mol, per mol of metal atom in the organometallic compound catalyst component (b).

The polymerization may be performed by a gas-phase polymerization method or a liquid-phase polymerization method, such as a solution polymerization method or a suspension polymerization method. Each step of the polymerization may be performed by a different method. The polymerization may be performed by a continuous method or a semicontinuous method. Each step of the polymerization may be performed in a plurality of polymerization reactors, for example, 2 to 10 polymerization reactors.

Inert hydrocarbons may be used as polymerization media. Liquid propylene may be used as a polymerization medium. The polymerization conditions of each step include a polymerization temperature in the range of approximately −50° C. to +200° C., preferably approximately 20° C. to 100° C., and a polymerization pressure in the range of normal pressure to 10 MPa (gauge pressure), preferably approximately 0.2 to 5 MPa (gauge pressure).

After the completion of the polymerization, if necessary, a known post-treatment process, such as a catalyst deactivation process, a catalyst residue removing process, or a drying process, may be performed to produce the ultra-high-molecular-weight propylene homopolymer (A) powder.
(Other Components)

Preferably, the polypropylene resin composition for use in the formation of a microporous membrane according to the present invention also comprises at least one material selected from the group consisting of a plasticizer, a polyolefin other than polypropylene, and an inorganic powder.
Polyolefin Other than Polypropylene In order to impart a function, such as shutdown characteristics, polyethylene may be added into the polypropylene resin composition for use in the formation of a microporous membrane according to the present invention.

The polyethylene refers to a polyethylene having a density in the range of 925 to 970 kg/m$^3$, preferably 930 to 965 kg/m$^3$.

The polyethylene preferably has an intrinsic viscosity [η] measured with a decalin solution in the range of 2 to 40 dl/g, more preferably 3 to 40 dl/g.

The amount of the polyethylene in a propylene-based resin composition comprising the ultra-high-molecular-weight propylene homopolymer (A) and the polyethylene depends on the characteristics to be imparted and generally ranges from 1% to 99% by mass, preferably 10% to 95% by mass.
Plasticizer In order to control the shape and number of pores, a plasticizer may be added to the polypropylene resin composition for use in the formation of a microporous membrane according to the present invention. The amount of plasticizer preferably ranges from 0 to 200 parts by mass, more preferably 10 to 150 parts by mass, still more preferably 20 to 100 parts by mass, per 100 parts by mass of the ultra-high-molecular-weight propylene homopolymer (A).

Examples of the plasticizer include solvents that are liquid at room temperature, such as aliphatic, alicyclic, and aromatic hydrocarbons, for example, nonane, decane, decalin, paraxylene, and liquid paraffin, and mineral oil fractions having corresponding boiling points, and solvents that are solid at room temperature, such as stearyl alcohol and paraffin wax. Among these, solvents that are liquid at room temperature are preferred, and liquid paraffin is particularly preferred.
Inorganic Powder In order to control the shape and number of pores and heat resistance, an inorganic powder may be added to the polypropylene resin composition for use in the formation of a microporous membrane according to the present invention.

Examples of the inorganic powder include talc, clay, calcium carbonate, mica, silicates, carbonates, glass fiber, carbon fiber, and oxides and nitrides of metals, such as silicon, aluminum and titanium. Among these, oxides and nitrides of metals are preferred, and a silica powder is particularly preferred. It is desirable that the inorganic powder have an average particle size in the range of 0.001 to 10 μm, preferably 0.01 to 5 μm. The inorganic powder may be used alone or in combination. The amount of inorganic powder per 100 parts by weight of the polypropylene resin composition for use in the formation of a microporous membrane preferably ranges from 1 to 80 parts by weight, more preferably 10 to 60 parts by weight.

(Method for Preparing Polypropylene Resin Composition for Use in Formation of Microporous Membrane)

A method for preparing the polypropylene resin composition for use in the formation of a microporous membrane according to the present invention may be carried out by any of various known methods. In one exemplary method, various components described above are kneaded in a common kneader, such as a Henschel mixer, a ribbon blender, or a Banbury mixer. Melt-kneading and pelletization involve melt-kneading with a common single-screw or twin-screw extruder, a Brabender, or a roll at 170° C. to 280° C., preferably 190° C. to 250° C., and pelletization. Alternatively, the polypropylene resin composition may be directly formed into a sheet or film for a microporous membrane by a conventionally known technique without pelletization.

(Applications)

Preferably, the polypropylene resin composition for use in the formation of a microporous membrane according to the present invention is used for at least one selected from the group consisting of a separator, a filter membrane, a separation membrane, and a filter. A Separator, a filter membrane, a separation membrane, and a filter formed of the polypropylene resin composition for use in the formation of a microporous membrane have excellent heat resistance and strength.

The separator is more preferably a battery separator or a condenser separator. The battery separator is particularly preferably a lithium-ion secondary battery separator. The separation membrane is more preferably a medical separation membrane.

(Microporous Membrane)

Microporous membranes having excellent heat resistance and strength can be suitably manufactured from the polypropylene resin composition for use in the formation of a microporous membrane.

A method for manufacturing the microporous membrane includes the steps of (1) melt-kneading the polypropylene resin composition or each component of the polypropylene resin composition, (2) carrying out extruding from die lips and cooling to form a sheet or film, (3) stretching the sheet or film in at least one direction, if necessary (4) extracting or removing a plasticizer, and (5) drying the resulting membrane. Any of these steps may be performed by a conventionally known technique. In order for sufficient melt-kneading in the step (1), a twin-screw extruder is desirable. In the step (2), although rectangular die lips for sheet extrusion are desirable, a cylindrical blown-film die lip may also be used. In the step (3), it is desirable to stretch the sheet or film by a tenter method or a roll method at a stretching temperature in the range of 60° C. to 160° C. at an area magnification factor in the range of 2 to 100. The stretching may be performed before and after the step (4) or (5) in twice. In the step (4), it is desirable to use an extracting solvent that is a poor solvent for a polyolefin resin and an inorganic powder and a good solvent for a plasticizer and has a boiling point lower than the melting point of the polyolefin microporous membrane. Examples of the extracting solvent include hydrocarbons, such as n-hexane and cyclohexane, halogenated hydrocarbons, such as methylene chloride and carbon tetrachloride, alcohols, such as ethanol and isopropanol, ethers, such as diethyl ether, and ketones, such as acetone. The step (5) employs a heat-drying method or an air-drying method. These methods are desirably performed at a temperature at which the characteristics of the microporous membrane are not deteriorated. If necessary, other steps may be performed, such as the addition of an additive agent, such as a conventionally known nucleating agent (α-crystalline nucleating agent, such as a phosphate metal salt or a sorbitol type compound, or β-crystalline nucleating agent, such as an amide type compound), heat treatment of the membrane, cross-linking treatment, surface treatment, and hydrophilic treatment. In order to impart a shutdown function, blending or multilayering with a resin (containing the polyethylene) having a lower melting point than the polypropylene resin composition may be performed. In order to impart further heat resistance, blending or multilayering with a resin having a higher melting point than the polypropylene resin composition may be performed.

EXAMPLES

While the present invention will now be more specifically described in the following examples, the present invention is not limited to these examples. The properties in the examples and comparative examples were measured by the following methods.

(m1) Intrinsic Viscosity [η]

The intrinsic viscosity [$\eta$] of a propylene homopolymer was measured with a decalin solvent at 135° C. as described below.

Approximately 20 mg of a sample was dissolved in 15 ml of decalin, and the specific viscosity $\eta_{sp}$ was measured in an oil bath at 135° C. After the decalin solution was diluted with additional 5 ml of a decalin solvent, the specific viscosity $\eta_{sp}$ was measured in the same manner. The dilution was repeated twice more. $\eta_{sp}/C$ extrapolated to a concentration (C) of zero was determined as the intrinsic viscosity.

$$[\eta] = lim\ (\eta_{sp}/C)\ (C \rightarrow 0)$$

(m2) Mesopentad Fraction

The mesopentad fraction [mmmm] of a propylene homopolymer is a value defined by the assignments described in A. zambelli et al., Macromolecules, 8, 687 (1975) and was determined by the equation: mesopentad fraction=(peak area at 21.7 ppm)/(peak area in the range of 19 to 23 ppm), as measured by $^{13}$C-NMR under the following conditions.

Type JNM-Lambada 400 (manufactured by JEOL Ltd.)
    Resolution 400 MHz
    Measurement temperature 125° C.
    Solvent 1,2,4-trichlorobenzene/deuterated benzene=7/4
    Pulse width 7.8 μsec
    Pulse interval 5 sec
    Number of scans 2000
    Chemical Shift Reference TMS=0 ppm
    Mode single pulse broadband decoupling (m3) Melting Point (Tm)

The melting point (Tm) of a propylene homopolymer was measured with a differential scanning calorimeter (DSC, manufactured by PerkinElmer, Inc.) in the following manner. An endothermic peak in the third step was defined as the melting point (Tm).

Preparation of Sample Sheet

A sample placed between aluminum foil was pressed with a metal mold (thickness: 0.2 mm) under the following conditions.

Forming temperature: 240° C. (heating temperature: 240° C., preheating time: 7 minutes)
Pressing pressure: 300 kg/cm$^2$
Pressing time: 1 minute After press forming, the metal mold was cooled to approximately room temperature in ice water to form a sample sheet.

Measurement

Approximately 0.4 g of the resulting sample sheet was enclosed in a container described below and was subjected to DSC measurement under measurement conditions described below.

Container

Aluminum Pan (DSC PANS 10 μl BO-14-3015)
Aluminum Cover (DSC COVER B014-3003)

Measurement Conditions

First step: Heating to 240° C. at 30° C./min and holding for 10 minutes.
Second step: Cooling to 30° C. at 10° C./min.
Third step: Heating to 240° C. at 10° C./min.

(m4) Weight-Average Molecular Weight (Mw)

The weight-average molecular weight (Mw) of a propylene homopolymer was measured with GPC-150C Plus manufactured by Waters Corp. in the following manner.

The separation columns were TSKgel GMH6-HT and TSKgel GMH6-HTL, each of which has an inner diameter of 7.5 mm and a length of 600 mm. The column temperature was 140° C. The mobile phase was o-dichlorobenzene (Wako Pure Chemical Industries, Ltd.) containing 0.025% by mass BHT (Wako Pure Chemical Industries, Ltd.) as an antioxidant and was fed at 1.0 ml/min. The sample concentration was 0.1% by mass. The sample injection volume was 500 microliters. A differential refractometer was used as a detector. For standard polystyrene, a product by Tosoh Corp. was used for a molecular weight Mw<1000 and Mw>4×10$^6$, and a product by Pressure Chemical Co. was used for a molecular weight 1000≤Mw≤4×10$^6$.

(m5) Residual Cl Amount (ppm)

0.8 g of a propylene homopolymer was burned at a temperature in the range of 400° C. to 900° C. in an argon/oxygen stream in a combustion apparatus manufactured by Mitsubishi Kasei Corp. The combustion gas was then collected into ultrapure water. After concentration, the sample liquid was introduced into Nippon Dionex DIONEX-DX300 ion chromatograph. The amount of residual Cl in the propylene homopolymer was measured with an anion column AS4A-SC (manufactured by Dionex Corp.).

(m6) Ash Content

The ash content of a propylene homopolymer was measured in the following manner.

Propylene homopolymer pellets were completely burned in a crucible. The crucible was placed in an electric furnace at 800° C. for 2 hours for ashing. The residual ash in the crucible was weighed to determine the ash content (wt ppm).

(m7) Gurley Permeability

The Gurley permeability of a microporous membrane was measured in accordance with JIS P8117.

(m8) Puncture Strength

The puncture strength of a microporous membrane was measured in the following manner.

A 0.5-mmR needle having a diameter of 1 mm was used to puncture a microporous membrane at 2 mm/s. The maximum load measured was converted into a load corresponding to a thickness of 25 mm.

(m9) Meltdown Temperature

The meltdown temperature of a microporous membrane was measured in the following manner.

A 2 g weight was attached to a microporous membrane. The microporous membrane was heated at 5° C./min. A temperature at which the microporous membrane was melted and broken was considered as the meltdown temperature.

(m10) Temperature-Rising Elution Fractionation (TREF) Measurement

The elution temperature-elution volume curve of a propylene homopolymer was prepared by temperature-rising elution fractionation (TREF) as described below. The peak top temperature of the maximum peak and the half-width of the peak were determined.

First, a sample solution of a sample (propylene homopolymer) dissolved in o-dichlorobenzene was introduced into a packed TREF column (column temperature 95° C.). The column temperature was then decreased to 0° C. at a cooling rate of 0.5° C./min and was held for 10 minutes to crystallize the sample on the surface of the packing material.

The column temperature was then increased to 140° C. at a heating rate of 1.0° C./min. The concentration of the sample (propylene homopolymer) eluted was measured at different temperatures. The elution temperature-elution volume curve was prepared from the elution volume (% by mass) of the sample (propylene homopolymer) as a function of the column temperature (° C.). The peak top temperature of the maximum peak and the half-width of the peak were determined.

(Measurement Conditions)

Measuring apparatus: temperature-rising elution fractionation apparatus TREF200+ (manufactured by Polymer ChAR)

TREF column: stainless steel microball column (3/8" o.d.× 150 mm)

Eluent: o-dichlorobenzene (containing 300 ppm BHT) (=ODCB)

Sample concentration: 0.2% (w/v)
Injection volume: 0.3 mL
Pump flow rate: 0.5 mL/min
Detector: infrared spectrophotometer IR4 (manufactured by Polymer ChAR)
Detection wave number: 3.42 μm
Sample dissolution conditions: dissolution at 150° C. for 90 min →left still at 95° C. for 45 min Synthesis Example 1

Synthesis of Propylene Homopolymer (PP1)

(1) Prepolymerization

A 0.5-liter three-neck flask equipped with a stirrer was purged with nitrogen gas and was then charged with 400 ml of dehydrated heptane, 18 mmol of triethylaluminum, 3.7 mmol of dicyclopentyldimethoxysilane, and 4 g of a solid titanium catalyst component (TK200 catalyst manufactured by Mitsui Chemicals, Inc.). Propylene was introduced into the flask at an internal temperature of 20° C. while stirring. After 1 hour, the agitation was stopped. 2.0 g of propylene per gram of the solid catalyst had been polymerized to produce a prepolymerized catalyst component.

(2) Propylene Polymerization

A 6-liter stainless autoclave equipped with a stirrer was completely dried, was purged with nitrogen, and was charged with 6 liters of dehydrated heptane, 6 mmol of triethylaluminum, and 1.2 mmol of dicyclopentyldimethoxysilane. After nitrogen in the system was replaced with propylene, propylene was introduced while stirring. After the system was stabilized at an internal temperature of 80° C. and a propylene pressure of 0.8 MPa-G, 100 ml of heptane slurry containing 0.46 mmol (in terms of a Ti atom) of the prepolymerized catalyst component was added. Propylene was continuously supplied and polymerized at 80° C. for 4 hours.

After the completion of the polymerization, cooling, and depressurization, 100 ml of butanol was added for deashing at 85° C. for 1 hour. After cooling again, the entire content was transferred into a filter tank provided with a filter and solid-liquid separated. This was followed by washing at 70° C. by the addition of 4 liters of heptane and 2 liters of distilled water, and solid-liquid separation. Subsequent vacuum drying for 4 hours yielded 3200 g of a propylene polymer.

Table 1 shows the characteristics of the resulting propylene homopolymer (PP1).

Synthesis Example 2

Synthesis of Propylene Homopolymer (PP2)

(1) Prepolymerization

A 0.5-liter three-neck flask equipped with a stirrer was purged with nitrogen gas and was then charged with 400 ml of dehydrated heptane, 18 g of diethylaluminum chloride, and 2 g of a commercially available Solvay-type titanium trichloride catalyst (manufactured by Tosoh Finechem Corp.). While the internal temperature was kept at 20° C., propylene was introduced into the flask while stirring. After 80 minutes, the agitation was stopped. 0.8 g of propylene per gram of the solid catalyst had been polymerized to produce a prepolymerized catalyst component.

(2) Propylene Polymerization

A 6-liter stainless autoclave equipped with a stirrer was completely dried, was purged with nitrogen, and was charged with 6 liters of dehydrated heptane. Nitrogen in the system was replaced with propylene. Propylene was then introduced while stirring. After the system was stabilized at a temperature of 40° C. and a pressure of 0.8 MPa-G, 600 ml of heptane slurry containing 3.0 g (in terms of a solid catalyst) of the prepolymerized catalyst component was added. Propylene was continuously supplied and polymerized at 40° C. for 7 hours.

After the completion of the polymerization, cooling, and depressurization, 100 ml of butanol was added for deashing at 85° C. for 1 hour. After cooling again, the entire content was transferred into a filter tank provided with a filter and solid-liquid separated. This was followed by washing at 70° C. by the addition of 4 liters of heptane and 2 liters of distilled water, and solid-liquid separation. Subsequent vacuum drying for 4 hours yielded 3650 g of a propylene polymer.

Table 1 shows the characteristics of the resulting propylene homopolymer (PP2).

Synthesis Example 3

Synthesis of Propylene Homopolymer (PP3)

(1) Prepolymerization

A prepolymerized catalyst component was prepared in the same manner as in [the synthesis example 2].

(2) Propylene Polymerization

A 6-liter stainless autoclave equipped with a stirrer was completely dried, was purged with nitrogen, and was charged with 6 liters of dehydrated heptane. Nitrogen in the system was replaced with propylene. Propylene was then introduced while stirring. After the system was stabilized at a temperature of 70° C. and a pressure of 0.8 MPa-G, 200 ml of heptane slurry containing 1.0 g (in terms of a solid catalyst) of the prepolymerized catalyst component was added. Propylene was continuously supplied and polymerized at 70° C. for 5 hours.

After the completion of the polymerization, cooling, and depressurization, 100 ml of butanol was added for deashing at 85° C. for 1 hour. After cooling again, the entire content was transferred into a filter tank provided with a filter and solid-liquid separated. This was followed by washing at 70° C. by the addition of 4 liters of heptane and 2 liters of distilled water, and solid-liquid separation. Subsequent vacuum drying for 4 hours yielded 2740 g of a propylene polymer.

Table 1 shows the characteristics of the resulting propylene homopolymer (PP3).

Synthesis Example 4

Synthesis of Propylene Homopolymer (PP4)

(1) Prepolymerization

A prepolymerized catalyst component was prepared in the same manner as in [the synthesis example 1].

(2) Propylene Polymerization

A 6-liter stainless autoclave equipped with a stirrer was completely dried, was purged with nitrogen, and was charged with 6 liters of dehydrated heptane, 6 mmol of triethylaluminum, and 1.2 mmol of dicyclopentyldimethoxysilane. After nitrogen in the system was replaced with propylene, 0.02 MPa-G of hydrogen was supplied, and propylene was then introduced while stirring. After the system was stabilized at an internal temperature of 80° C. and a pressure of 0.8 MPa-G, 18 ml of heptane slurry containing 0.084 mmol (on a Ti atom basis) of the prepolymerized catalyst component was added. Propylene was continuously supplied and polymerized at 80° C. for 4 hours.

After the completion of the polymerization, cooling, and depressurization, 100 ml of butanol was added for deashing at 85° C. for 1 hour. After cooling again, the entire content was transferred into a filter tank provided with a filter and solid-liquid separated. This was followed by washing at 70° C. by the addition of 4 liters of heptane and 2 liters of distilled water, and solid-liquid separation. Subsequent vacuum drying for 4 hours yielded 2900 g of a propylene polymer.

Table 1 shows the characteristics of the resulting propylene homopolymer (PP4).

Synthesis Example 5

Synthesis of Propylene Homopolymer (PP5)

(1) Prepolymerization

A 0.5-liter three-neck flask equipped with a stirrer was purged with nitrogen gas and was then charged with 400 ml of dehydrated heptane, 18 g of diethylaluminum chloride, and 2 g of a commercially available Solvay-type titanium trichloride catalyst (manufactured by Tosoh Finechem Corp.). While the internal temperature was kept at 20° C., propylene was introduced into the flask while stirring. After 80 minutes, the agitation was stopped. 0.8 g of propylene per gram of the solid catalyst had been polymerized to produce a prepolymerized catalyst component.

(2) Propylene Polymerization

A 6-liter stainless autoclave equipped with a stirrer was completely dried, was purged with nitrogen, and was charged with 6 liters of dehydrated heptane. Nitrogen in the system was replaced with propylene. Propylene was then introduced while stirring. After the system was stabilized at a temperature of 50° C. and a pressure of 0.8 MPa-G, 300 ml of heptane slurry containing 1.5 g (in terms of a solid catalyst) of the prepolymerized catalyst component was added. Propylene was continuously supplied and polymerized at 50° C. for 6 hours.

After the completion of the polymerization, cooling, and depressurization, 100 ml of butanol was added for deashing at 85° C. for 1 hour. After cooling again, the entire content was transferred into a filter tank provided with a filter and solid-liquid separated. This was followed by washing at 70° C. by the addition of 4 liters of heptane and 2 liters of distilled water, and solid-liquid separation. Subsequent vacuum drying for 4 hours yielded 3210 g of a propylene polymer.

Table 1 shows the characteristics of the resulting propylene homopolymer (PP5).

Synthesis Example 6

(1) Prepolymerization

A 0.5-liter three-neck flask equipped with a stirrer was purged with nitrogen gas and was then charged with 400 ml of dehydrated heptane, 18 mmol of triethylaluminum, 3.7 mmol of dicyclopentyldimethoxysilane, and 4 g of a solid titanium catalyst component (TK200 catalyst manufactured by Mitsui Chemicals, Inc.). Propylene was introduced into the flask at an internal temperature of 20° C. while stirring. After 1 hour, the agitation was stopped. 2.0 g of propylene per gram of the solid catalyst had been polymerized to produce a prepolymerized catalyst component.

(2) Propylene Polymerization

A 6-liter stainless autoclave equipped with a stirrer was completely dried, was purged with nitrogen, and was charged with 6 liters of dehydrated heptane, 6 mmol of triethylaluminum, and 1.2 mmol of dicyclopentyldimethoxysilane. After nitrogen in the system was replaced with propylene, propylene was introduced while stirring. After the system was stabilized at an internal temperature of 50° C. and a propylene pressure of 0.8 MPa-G, 150 ml of heptane slurry containing 0.69 mmol (in terms of a Ti atom) of the prepolymerized catalyst component was added. Propylene was continuously supplied and polymerized at 50° C. for 8 hours.

After the completion of the polymerization, cooling, and depressurization, 100 ml of butanol was added for deashing at 85° C. for 1 hour. After cooling again, the entire content was transferred into a filter tank provided with a filter and solid-liquid separated. This was followed by washing at 70° C. by the addition of 4 liters of heptane and 2 liters of distilled water, and solid-liquid separation. Subsequent vacuum drying for 4 hours yielded 3010 g of a propylene polymer.

Table 1 shows the characteristics of the resulting propylene homopolymer (PP6).

TABLE 1

| Item | | Unit | PP1 | PP2 | PP3 | PP4 | PP5 | PP6 |
|---|---|---|---|---|---|---|---|---|
| [η] | | dl/g | 7.8 | 20.2 | 10.8 | 2.0 | 16.5 | 9.3 |
| mmmm | | % | 95.4 | 93.5 | 86.4 | 96.5 | 91.0 | 94.0 |
| Residual Cl amount | | ppm | 4 | 6 | 32 | 6 | 10 | 5 |
| Ash content | | ppm | 14 | 25 | 50 | 20 | 30 | 20 |
| Melting point | | °C. | 162 | 160 | 160 | 164 | 159 | 162 |
| Mw | | — | 1,650,000 | 4,700,000 | 2,200,000 | 360,000 | 4,500,000 | 1,900,000 |
| TREF | Integral elution volume up to 100° C. | % | 16.0 | 1.4 | 15.6 | 18.7 | 9.6 | 15.2 |
| | Peak top temperature | °C. | 120.4 | 117.7 | 115.5 | 119.0 | 117.7 | 118.1 |
| | Peak half-width | °C. | 5.0 | 2.7 | 5.6 | 3.2 | 2.8 | 4.8 |

Examples 1 to 4 and Comparative Examples 1 and 2

In the amount shown in Table 2, the polypropylene resin composition, 1000 ppm of an antioxidant Irganox 1010, and solid paraffin or liquid paraffin were fed to Labo Plastomill (manufactured by Toyo Seiki Seisaku-Sho, Ltd.) at 250° C. and the number of revolutions of 20 rpm and were kneaded at 60 rpm for 3 minutes. Hot pressing at 220° C. at 100 kg/cm$^2$ and cooling to 30° C. yielded a pressed sheet having a thickness of 500 μm. The pressed sheet was stretched by 4fold× 5fold at 150° C. to prepare a stretched film. The stretched film was immersed in n-heptane at room temperature for 2 hours and was then vacuum-dried at room temperature for 4 hours to remove the solid paraffin or the liquid paraffin, forming a microporous membrane. Table 2 shows the properties of the microporous membrane.

TABLE 2

| | Item | Unit | Example 1 | Example 2 | Example 3 | Example 4 | Comparative example 1 | Comparative example 2 |
|---|---|---|---|---|---|---|---|---|
| Formulation | PP1 | wt % | 50 | — | | | — | — |
| | PP2 | | — | 50 | | | — | — |

TABLE 2-continued

| | Item | Unit | Example 1 | Example 2 | Example 3 | Example 4 | Comparative example 1 | Comparative example 2 |
|---|---|---|---|---|---|---|---|---|
| | PP5 | | — | — | 50 | — | — | — |
| | PP6 | | — | — | — | 50 | — | — |
| | PP3 | | — | — | — | — | 50 | — |
| | PP4 | | — | — | — | — | — | 50 |
| | Solid paraffin | | 50 | — | 50 | 50 | 50 | 50 |
| | Liquid paraffin | | — | 50 | — | — | — | — |
| Pproperties of microporous membranes | Gurley permeability | sec/100 cc | 500 | 600 | 650 | 600 | 1100 | 700 |
| | Puncture strength | N | 5.4 | 6.5 | 6.4 | 5.5 | 6.1 | 3.2 |
| | Meltdown temperature | ° C. | 178 | 176 | 176 | 175 | 168 | 160 |

The invention claimed is:

1. A polypropylene resin composition for use in the formation of a microporous membrane comprising an ultra-high-molecular-weight propylene homopolymer (A) that satisfies the following requirements (1) to (4):
    (1) the intrinsic viscosity [η] measured with a decalin solution is 7 dl/g or more and less than 25 dl/g;
    (2) the mesopentad fraction as measured by $^{13}$C-NMR (nuclear magnetic resonance) ranges from 90.0% to 99.5%;
    (3) the melting point as measured with a differential scanning calorimeter (DSC) ranges from 153° C. to 167° C.; and
    (4) in an elution temperature-elution volume curve measured by temperature-rising elution fractionation (TREF) using o-dichlorobenzene, the maximum peak has a peak top temperature in the range of 116° C. to 125° C. and a half-width of 7.0° C. or less.

2. The polypropylene resin composition for use in the formation of a microporous membrane according to claim 1, further comprising at least one material selected from the group consisting of a plasticizer, a polyolefin other than polypropylene, and an inorganic powder.

3. The polypropylene resin composition for use in the formation of a microporous membrane according to claim 1, wherein the polypropylene resin composition is used for one selected from the group consisting of a separator, a filter membrane, a separation membrane, and a filter.

4. The polypropylene resin composition for use in the formation of a microporous membrane according to claim 3, wherein the separator is a battery separator or a condenser separator.

5. The polypropylene resin composition for use in the formation of a microporous membrane according to claim 4, wherein the battery separator is a lithium-ion secondary battery separator.

6. The polypropylene resin composition for use in the formation of a microporous membrane according to claim 3, wherein the separation membrane is a medical separation membrane.

* * * * *